United States Patent [19]
Burns et al.

[11] Patent Number: 5,385,086
[45] Date of Patent: Jan. 31, 1995

[54] ELECTROSTATIC ASSISTED DRY INGREDIENT DEPOSITION APPARATUS

[75] Inventors: Burns, San Clemente, Calif.; Darren L. Duggan, Waxahachie, Tex.

[73] Assignee: Par-Way Group, Irvine, Calif.

[21] Appl. No.: 263,038

[22] Filed: Jun. 21, 1994

[51] Int. Cl.⁶ .............. A47J 44/00; B05C 19/00; H05F 3/00
[52] U.S. Cl. .............. 99/451; 99/494; 99/DIG.14; 118/19; 118/24; 222/241; 222/412; 222/486
[58] Field of Search .......... 99/451, 494, DIG. 14; 99/340, 467, 483; 118/19, 24, 621, 626, 630, 631, 638, 639; 366/156–158, 186, 293, 295; 222/310, 412, 314, 413.1, 241, 485, 486, 330

[56] References Cited

U.S. PATENT DOCUMENTS

| | | | |
|---|---|---|---|
| 2,504,786 | 4/1950 | Bailey | 222/412 |
| 2,657,831 | 11/1953 | Pierce | 222/412 |
| 3,275,196 | 9/1966 | Warczak | 222/412 |
| 3,667,665 | 6/1972 | Spencer | 222/412 |
| 3,799,404 | 3/1974 | Taupin | 222/413 |
| 4,027,788 | 6/1977 | Parker et l. | 222/486 |
| 4,196,221 | 4/1980 | Dew | 99/451 |
| 4,218,126 | 8/1980 | Takechi | 222/413 |
| 4,338,882 | 7/1982 | Siggen et al. | 118/630 |
| 4,382,725 | 5/1983 | Dugge | 222/485 |
| 4,493,442 | 1/1985 | Hanson | . |
| 4,532,858 | 8/1985 | Hershfeld | 99/483 |
| 4,614,162 | 9/1986 | Ryan | . |
| 5,287,801 | 2/1994 | Clark | 99/451 |

FOREIGN PATENT DOCUMENTS 2240493A 8/1991 United Kingdom .

*Primary Examiner*—Timothy F. Simone
*Attorney, Agent, or Firm*—James A. Quinton; Frank Frisenda, Jr.

[57] ABSTRACT

According to the invention an apparatus for uniformly distributing a powdered or granular food material for application to a solid food product is provided. A dry ingredient distributor is provided which includes an auger surrounded by a distribution tube having a plurality of openings. Mounted to the distribution tube and vertically spaced therefrom at a preselected distance, is an electrostatic field generation means for generation of a substantially uniform electrostatic field horizontally along substantially the entire length of the distribution tube to generate an electrostatic field in the path of the food material exiting the outlets of the distribution tube.

19 Claims, 4 Drawing Sheets

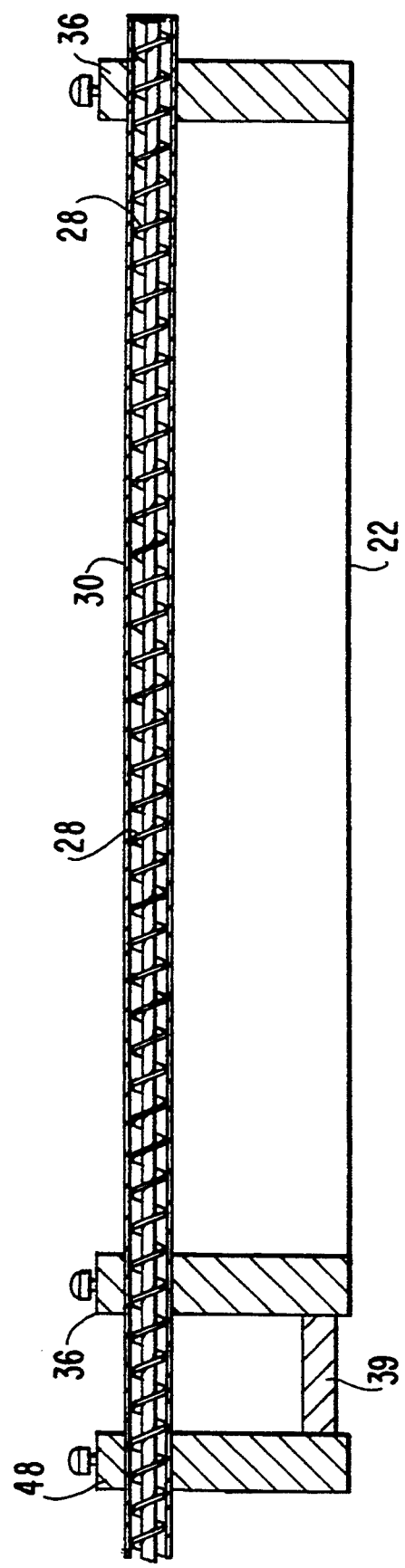

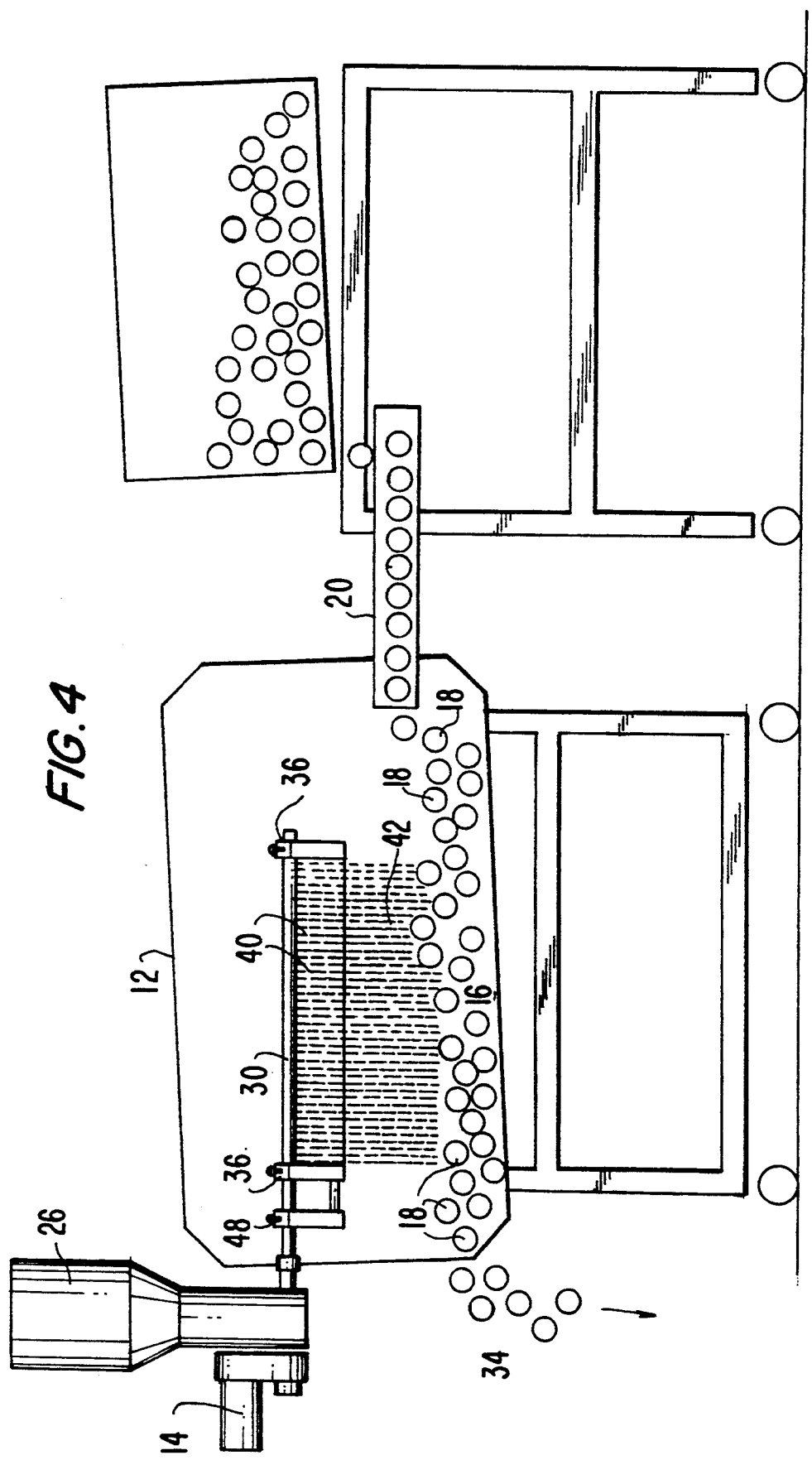

ELECTROSTATIC ASSISTED DRY INGREDIENT DEPOSITION APPARATUS

BACKGROUND OF THE INVENTION

1. Field of the Invention

The invention relates to an apparatus for application of powdered or granular material on a solid product. In particular, the invention relates to the application of a seasoning or spice on a snack food such as potato chips, corn chips or the like.

2. Description of the Prior Art

Screw or auger type conveyors are well known in the art. For example, U.S. Pat. No. 4,614,162 and U.S. Pat. No. 4,493,442 show an auger having a plurality of openings along the length of the auger for distribution of seasonings along its entire length. Such an arrangement allows for uniform distribution over a large area.

Electrostatic powder disposition of food flavoring products has been described in the prior art. For example, a screw conveyor arranged to convey flavoring from an inlet to a rotor disposed in a cylindrical chamber at the end of the conveyor and which includes an electrostatic charging head located adjacent the outlet of the cylindrical chamber is shown in U.S. Pat. No. 5,287,801. However, such devices require the inclusion of an electronic charging head within the food processing housing. Such placement can be undesirable from a sanitation standpoint. In addition, the field generated in such an arrangement is not uniform over any significant distances. Other electrostatic food flavoring application devices are also known in the art. See U.K. Patent No. 2,240,493A.

SUMMARY OF THE INVENTION

According to the invention an apparatus for uniformly distributing a powdered or granular food material for application to a solid food product is provided. In one aspect of the invention, a dry ingredient distributor is provided which includes an auger surrounded by a distribution tube having a plurality of openings. Preferably the openings extend along about one half or more of the length of the distribution tube and most preferably along substantially the entire length of the distribution tube. Mounted to the distribution tube and spaced therefrom at a preselected distance, is an electrostatic field generation means for generation of a substantially uniform electrostatic field horizontally along substantially the entire length of the distribution tube to generate an electrostatic field in the path of the food material exiting the outlets of the distribution tube. The electrostatic field generation means preferably includes a long thin wire made of a conducting material preferably a food safe metal preferably a stainless steel wire desirably having diameter from 0.01 to 0.03 inches. The wire preferably is mounted at a preselected distance from the distribution tube. Desirably adjustable support rods are mounted to the left and right sides of the distribution tube to support the electrostatic field generation wire and adjust its distance from the distribution tube. A power input is located adjacent to one of the support rods for transferring a high voltage current to the wire to form an electric field surrounding the wire. The dry ingredient distributor according to the invention can be placed over a conveyor belt or mounted within a housing, for example, mounted within a tumble drum to thereby efficiently supply an elecrostatically charged powdered or granular food material for application to a preselected solid substrate.

In another aspect of the invention a dry ingredient application device is provided which includes a housing which encloses a solid product transportation zone, which has been electrically grounded. Product, upon which the powdered or granular food material is to be applied, travels through this zone. The solid transportation zone preferably includes a rotating drum which has been grounded. An auger is provided within the housing for moving the powdered or granular food material from a storage bin or hopper for application to the solid product in the transportation zone. A distribution tube is provided which surrounds the auger. The distribution tube has a plurality of spaced openings along the entire length of the distribution tube for discharging the powdered or granular food material along substantially the entire length of the tube. An electric field generation means is provided to generate a controlled substantially uniform electric field along the entire length of the distribution tube and across which the powdered or granular food material exiting from the distribution tube must pass prior to its reaching the solid product transportation zone. Preferably the uniform electric field is generated by supplying a high voltage current across a long wire located adjacent to or within the path of the powdered or granular food material falling from the auger. The falling powdered or granulated food material travels across the substantially uniform electric field. As a result, a substantially uniform electric charge is provided to the powdered or granular food material and such material is ionized or otherwise charged as it falls through the electric field located between the distribution tube and the solid product transportation zone.

The electric field emanating from the electric field generation means preferably emanating from a long charged wire is spaced apart from the distribution tube a sufficient distance so that the charged powdered or granular material migrates toward the grounded transportation zone and not toward the distribution tube. Generally in order to prevent charged particles from adhering to the distribution tube and missing the solid product in the transportation zone, the electrostatic charging field should be located closer to transportation zone than to the distribution tube. As a result, the charged powdered or granular food material will be attracted to the transportation zone containing the solid food product.

It is an object of the invention to provide a controlled substantially uniform electric field over a substantial horizontal distance in a dry ingredient food distributor.

It is an object of the invention to provide an auger type powered granular food material distribution system which limits the electronic components introduced into the food processing housing in a solid ingredient application device.

It is an object of the invention to produce an electrostatic assisted auger distribution system which provides a substantially uniform electric field across a plurality of distribution orifices.

It is an object of the invention to provide an electrostatically assisted auger powdered or granular material distribution system which has its electronic field generation electronics located outside the housing for the food distribution system.

It is an object of the invention to provide electrostatically assisted auger powdered or granular food material disposition system which preferentially directs the charged food material toward the transportation zone containing a solid food product.

The preferred embodiment of the present invention is illustrated in the drawings and examples. However, it should be expressly understood that the present invention should not be limited solely to the illustrative embodiment.

DESCRIPTION OF THE DRAWINGS

FIG. 3 is a section A through A of FIG. 2.

FIG. 4 is a schematic sectional view of a distribution system according to the invention.

DETAILED DESCRIPTION OF THE INVENTION

Figure 1:
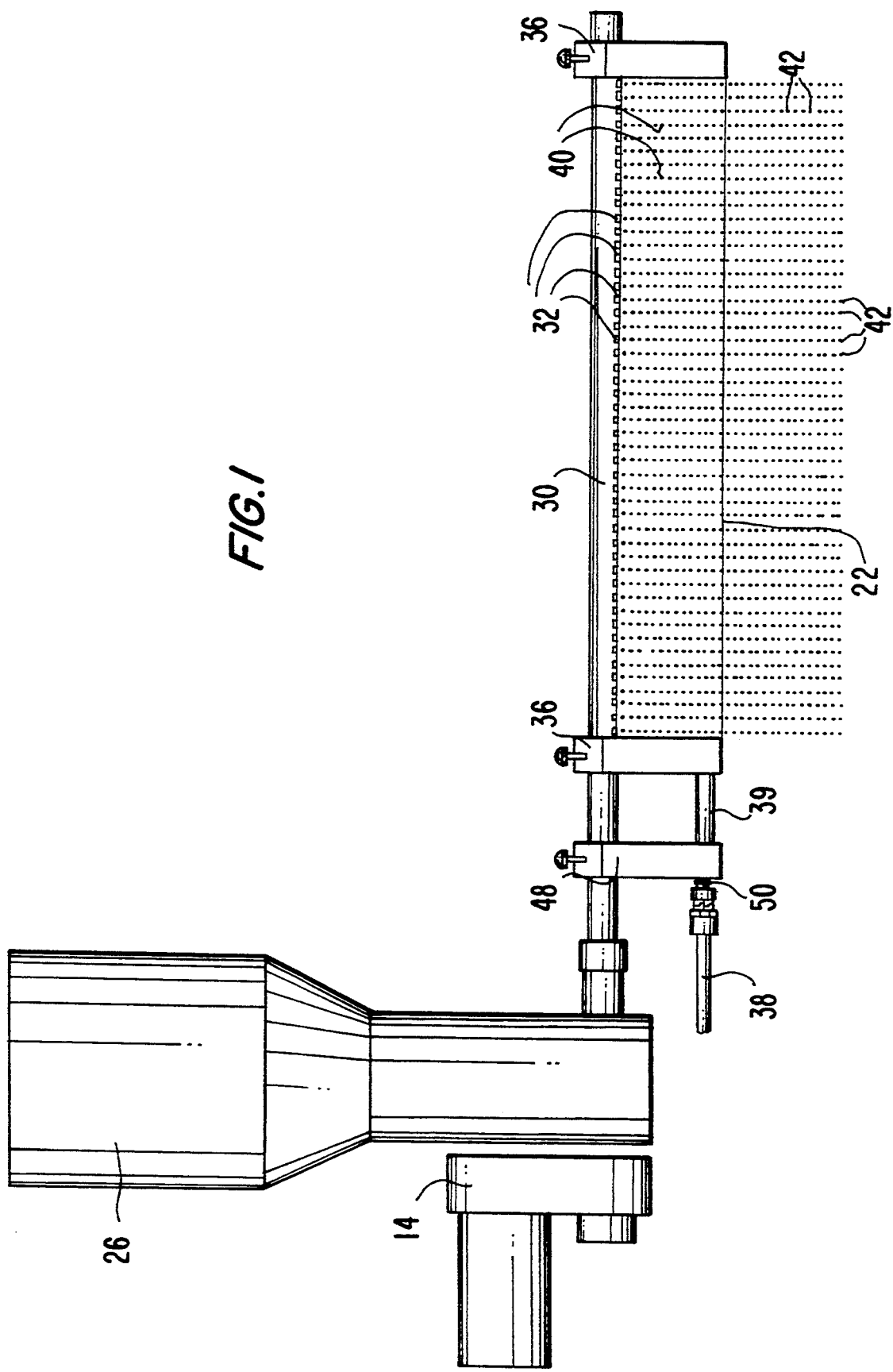
FIG. 1 is a partial schematic view of the distribution device according to the invention prior to installation in a housing.

According to the invention, a device for distributing a powdered or granular food material for application to a solid food product is provided. In one aspect of the invention, a dry ingredient distributor is provided which includes an auger surrounded by a distribution tube having a plurality of openings. Mounted to the distribution tube, and spaced therefrom at a preselected distance, is a linear electrostatic field generator for generation of a substantially uniform electrostatic field horizontally along substantially the entire length of the distribution tube to generate an electrostatic field in the path of the food material exiting the outlets of the distribution tube. Support rods are preferably mounted to the left and right sides of the distribution tube to support the electrostatic field generation means. The electrostatic field generation means preferably includes a long thin wire desirably having diameter from 0.01 to 0.03 inches. The wire preferably is mounted at a preselected distance from the distribution tube. A power input is supplied adjacent to one of the support rods for transferring a high voltage current to the wire to form an electric field surrounding the wire. The dry ingredient distributor according to the invention is then placed over a conveyor belt or mounted within a housing, for example, mounted within a tumble drum to thereby efficiently supply an electrostatically charged powdered or granular food material for application to a preselected solid substrate.

In another aspect of the invention, a device is provided which includes a housing which encloses a solid product transportation zone. Product, upon which the powdered or granular food material is to be applied, travels through the transportation zone. The solid product transportation zone preferably includes a rotating drum. The solid product, preferably a snack food such as corn or potato chips is moved through the zone preferably by a tumble drum from a product inlet. An auger is provided for moving the powdered or granular food material preferably a seasoning or spice from a storage bin or hopper for application to the solid product in the transportation zone. A distribution tube is provided which surrounds the auger. The distribution tube has a plurality of spaced openings along the entire length of the distribution tube for discharging the powered or granular food material along substantially the entire length of the auger within the housing. An electric field generator is provided to generate a controlled substantially uniform electric field horizontally along the entire length of the distribution tube and across which the powdered or granular food material exiting from the distribution tube must pass prior to its reaching the solid product transportation zone. The falling powdered or granular food material travels across a substantially uniform electric field. Preferably the uniform electric field is generated by supplying a high voltage current across a long wire located within the path of the powdered or granular food material exiting from the auger. As a result, an electric charge is provided to the powdered or granular food material and such material is ionized or otherwise charged as it falls through the electric field located between the distribution tube and the solid product transportation zone. The electric field emanating from the electric field generator preferably emanating from a long wire charged, is spaced apart from the distribution tube a sufficient distance so that the charged powdered or granular material migrates toward and is attracted to the grounded transportation zone and not toward the distribution tube. Preferably, the distance between the electric field generation means preferably a long charged wire and the grounded distribution zone is shorter than distance between the electric field generation means and the distribution tube. As a result, the charged powdered or granular food material will be attracted to the transportation zone containing the solid food product and the amount of charged particles adhering to the distribution tube and missing the solid product in the transportation zone will be minimized. Preferably the distribution tube spaced openings are tear drop shaped having their narrow ends pointed in the circumferential direction with adjustable opening sizes. Most preferably an auger and delivery tube arrangement as described in U.S. Pat. No. 4,493,442 which is hereby incorporated by reference is used.

Referring now to FIGS. 1 through 4, a powdered or granular food material application device 10 is provided. According to the invention the solid product in the transportation zone can be a solid product upon which it is desired to apply a powdered or granular solid. Examples of the solid product according to the invention includes snack food, such as potato or corn chips, pretzels, preferably potato chips. Optionally, meat patties, fried meat products, fried vegetable products with or without breading are contemplated according to the invention.

The powdered or granular food material applied on the solid food product according to the invention is preferably a spice or flavor for example, a dairy based additive, e.g., cheese or yogurt flavor; a spice or salt based additive e.g., garlic flavored additives; barbecue salt, onion salt, salsa flavoring, jalapeno flavoring, guacamole; sugar based compositions such as cinnamon.

A housing preferably a rotating drum 12 for example, a Soft Flight ® tumble drum supplied by Spray Dynamics ®, St. Clair, Mo., encloses a solid transportation zone 16 which is provided in the side of the sloping drum 12. The solid food product 18 preferably potato or corn chip is provided and transported along the solid product transport zone 16. The solid product 18 is directed into the drum 12 through inlet 20. A powdered or granular food material 40 is supplied from hopper 26 having controls 14 which are located outside of drum 12. The powdered or granular coating material is moved from hopper 26 by auger screw conveyor 28 as shown in FIG. 3. The auger 28 has a distribution tube 30 surrounding it and controlling the amount of product which is dispensed from the auger 28. Preferably the distribution tube 30 has a plurality of spaced openings 32 along the length of the auger as best shown in FIG. 1. Preferably the openings 32 are tear drop shaped. The auger 28 and distribution tube 30 preferably are as shown in the U.S. Pat. No. 4,493,442 which is herein incorporated by reference. As best seen in FIG. 1, the powdered or granular food product 40 preferably a spice for application on a solid food product 18 preferably a snack food such as potato chips, corn chips or the like fall through the spaced openings 32 in the distribution tube 30 and falls as a screen or curtain of descending particles.

Figure 2:
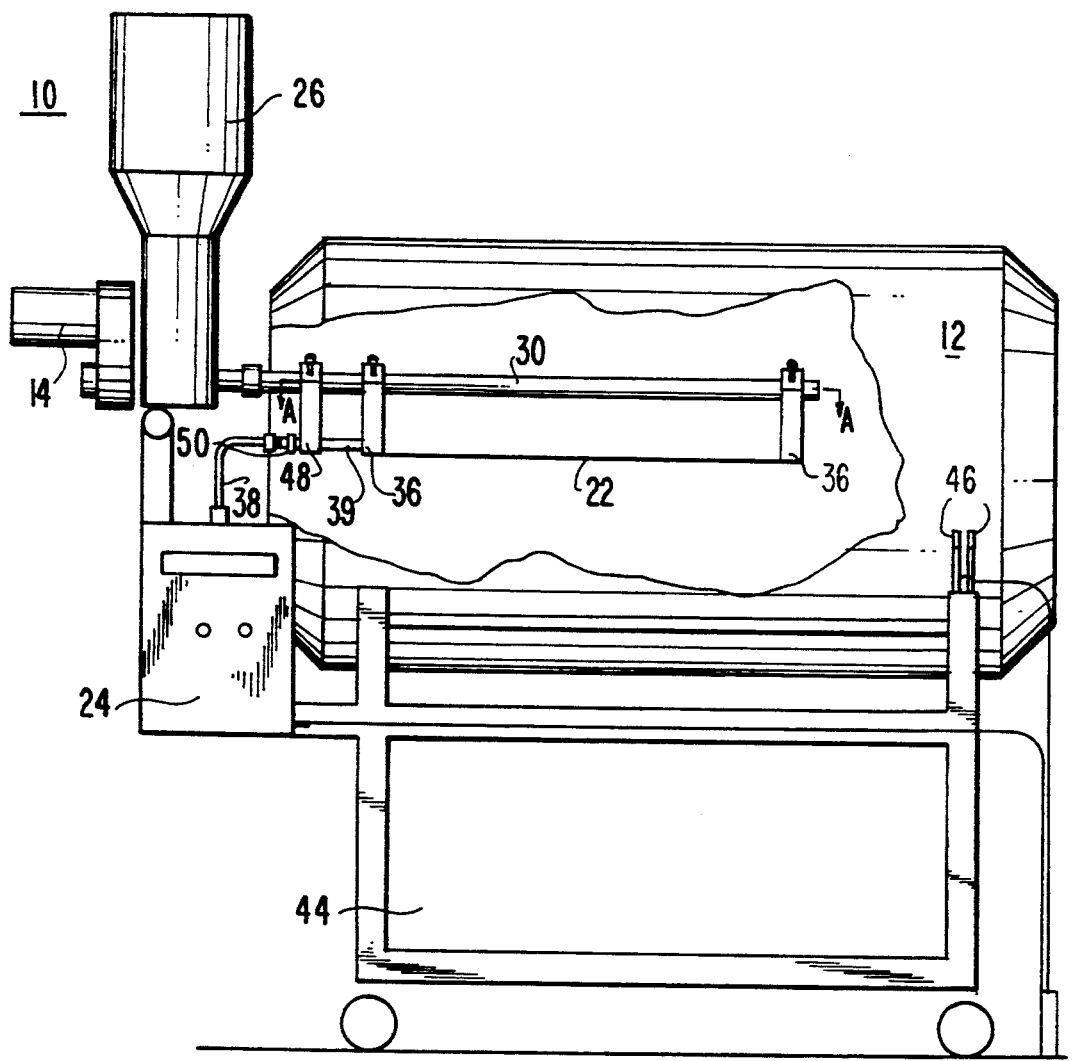
FIG. 2 is a side view of the distribution device according to the invention installed in a drum with a cut out showing of the location of distribution device within the drum.

As seen in FIG. 2 a substantially uniform electrostatic field is applied along the entire length of distribution tube 30. Preferably the electrostatic field is generated through electrostatic power supply 24 which is connected to a wire 22 and provides a high voltage current across the wire which in turn provides a controlled electrostatic field along the entire length of distribution to 30. Power supply 24 preferably has a controllable output voltage of from 0 to 40,000 volts and has an output current of up to 100 micro amps. During use, a high voltage current is applied across the wire. Preferably a voltage of from about 15,000 to 40,000 volts and desirably from 20,000 to 30,000 volts are applied across wire 22.

When charged, a substantially uniform electric field surrounds wire 22. Wire 22 is preferably mounted to and supported by distribution tube 30. Wire 22 is preferably a stainless steel conducting wire most preferably 306 SS wire preferably having a diameter of from 0.01" to 0.03" and most preferably having a diameter of 0.02". The wire 22 is located a preselected vertical distance from distribution tube 30 preferably 1" to 12" and most preferably at 6". The preselected distance can be varied depending on how much voltage is applied across the wire and how far away is the transportation zone. For a voltage of about 40,000 volts, the preselected distance is preferably about 6". The length of the wire is dependent upon the length of the distribution tube 30 and the length of the curtain of particles. For a distribution tube 30 having a length of about 39", the wire length should be about 40". The wire 22 is spaced apart from the distribution tube 30 but adjacent to or within the falling curtain of particles descending from the distribution tube 30. Preferably wire 22 is located within 1" of the curtain of falling particles from the discharge orifices 32. Desirably the wire 22 is with 0.5" of the curtain of particles. Most preferably the wire 22 is located directly below the discharge orifices 32 in distribution tube 30. Thus, as the powdered or granular food product 40 for application on the solid food product 18 descends in a curtain of falling particles from the orifices 32 in distribution tube 30, the powdered or granular product 40 passes through the horizontally uniform electric field generated around wire 22. The portion of the powdered or granular product which may be ionizable or otherwise retain an electrostatic charge are charged. As a result, the charged granular or powdered food product 42 better adheres to the solid food product moving through the solid product transportation zone. The coated solid product then exits from the drum at exit 34, with the desired powdered or granular food product uniformly applied.

As best seen in FIG. 2, support assemblies 36 are provided for the wire 22 and hold it at a predetermined distance from distribution tube 30 preferably from 1" to 12" from tube 30. The conducting wire can be any non-toxic, food safe conducting metal material, preferably stainless steel wire 22 preferably having a diameter 0.01 to 0.03 preferably about 0.02 inches is used. Preferably wire 22 extends the length of the distribution tube. Thus, for a typical distribution tube of about 39" long, the wire 22 would be about 40" long. The wire 22 is interconnected to power supply 24 through connecting wires 38 and 39 and electrical input 50. The connecting wires 38 and 39 and input 50 are supported by distribution tube 30 through support 48. The drum 12 includes grounding brushes preferably silver impregnated grounding brushes 46 which are connected to the ground at 42. A cart 44 is provided to support the drum 12. Cart 44 tilts so the drum 12 can be tilted and rotated as desired.

Wire 22 is preferably located at a greater distance from transportation tube 30 than is the distance between wire 22 and the portion of drum 12 defining the transportation zone 16. Transportation zone 16 is grounded by brushes 46 and ground 42. Distribution tube 30 is also grounded through controller 14. Preferably the wire 22 will be located from 1 to 12 inches from the transportation tube 30. More preferably the wire 22 will be located about six inches from the transportation tube 30. These distances may be adjusted depending on the amount of voltage applied to wire 22. Preferably at about 40,000 volts, a 6" spacing from the distribution tube will be preferred. The electrostatic field emanating from long wire 22 is desirably vertically spaced apart from the distribution tube a sufficient distance so that the charged powdered or granular material migrates toward the grounded transportation zone and does not migrate upward toward the distribution tube. In the event that the distance between the long wire 22 and the distribution tube 30 is too small, the charged particles will be attracted toward distribution 30 and hence, will not reach the targeted solid material in the transportation zone.

The foregoing is considered as illustrative only to the principles of the invention. Further, since numerous changes and modifications will occur to those skilled in the art, it is not desired to limit the invention to the exact construction and operation shown and described above, and accordingly all suitable modifications and equivalents may be resorted to, falling within the scope of the invention.

We claim:

1. A dry ingredient distributor comprising, an auger for moving powdered or granular food material from a storage bin for application to a solid food product;

a distribution tube surrounding said auger;

said distribution tube having a plurality of spaced openings for discharging said powdered or granular food material in a curtain of falling powdered or granular food material along at least one half the length of said distribution tube;

electrostatic field generation means to generate a substantially uniform electric field at a preselected distance from said distribution tube;

said uniform electrostatic field extending horizontally along substantially the entire length of said distribution tube and along the curtain of falling powdered or granular food material.

2. A dry ingredient distributor according to claim 1 wherein the spaced openings extend substantially the entire length of said distribution tube.

3. A dry ingredient distributor according to claim 1 wherein said electrostatic field generation means includes a long metal wire mounted to said distribution tube at a preselected distance from said distribution tube.

4. A dry ingredient distributor according to claim 3 wherein said metal wire is a stainless steel metal wire.

5. A dry ingredient distributor according to claim 4 wherein said preselected distance is from 1" to 12".

6. A dry ingredient distributor according to claim 5 wherein said preselected distance is 6".

7. A dry ingredient distributor according to claim 3 further comprising a solid product transportation means for transporting a solid product, said solid product means in communication with the curtain of falling powdered or granular food material.

8. A dry ingredient distributor according to claim 7 wherein said transportation means is a conveyor or a tumble drum.

9. A dry ingredient distributor according to claim 8 further comprising means to selectively apply a voltage of from 0.0 to 40,000 volts across said wire.

10. A dry ingredient distributor according to claim 8 wherein said wire is a stainless steel wire having a diameter from 0.01 to 0.03 inches.

11. An apparatus for uniformly distributing a powdered or granular food material for application to a solid food product comprising;
a housing;
a solid product transportation zone located within said housing;
transport means to move a solid food product through said solid product transportation zone;
an auger for moving powdered or granular food material from a storage bin for application to said solid food product;
a distribution tube surrounding said auger;
said distribution tube having a plurality of spaced openings along at least one-half the length of said distribution tube for discharging said powdered or granular food material;
said solid product transportation zone receiving said powder or granular food material discharged from said distribution tube;
electrostatic field generation means to generate a substantially uniform electric field at a preselected vertical distance from said distribution tube said uniform electric field extending horizontally along the entire length of said distribution tube;
said uniform electric field located between said distribution tube and said solid product transportation zone so that powdered or granular food material falling from said spaced openings travels across said substantially uniform electric field to provide a charge to said powdered or granular food material falling from said spaced openings prior to said powdered or granular food material reaching said solid product transportation zone.

12. An apparatus for uniformly distributing a powdered or granular food material for application to a solid food product according to claim 11 wherein the spaced openings extend substantially the entire length of said distribution tube.

13. An apparatus for uniformly distributing a powdered or granular food material for application to a solid food product according to claim 11 wherein said electrostatic field generation means includes a long metal wire mounted to said distribution tube at a preselected distance from said distribution tube.

14. An apparatus for uniformly distributing a powdered or granular food material for application to a solid food product according to claim 13 wherein said preselected distance is from about 1" to 12".

15. An apparatus for uniformly distributing a powdered or granular food material for application to a solid food product according to claim 13 wherein said preselected distance is about 6".

16. An apparatus for uniformly distributing a powdered or granular food material for application to a solid food product according to claim 13 wherein said electrostatic field generation means includes means to selectively apply a voltage of from 0.0 to 40,000 volts across said wire.

17. An apparatus for uniformly distributing a powdered or granular food material for application to a solid food product according to claim 13 wherein said wire is a stainless steel wire.

18. An apparatus for uniformly distributing a powdered or granular food material for application to a solid food product according to claim 17 wherein said wire has a diameter of from 0.01" to 0.03".

19. An apparatus for uniformly distributing a powdered or granular food material for application to a solid food product according to claim 16 wherein said uniform electric field generation means includes a power supply for providing an electrostatic charge to said wire;
said power supply located exterior to said housing whereby the electronic components directly included within said housing are minimized.

* * * * *